(12) United States Patent
Lin

(10) Patent No.: US 9,469,323 B2
(45) Date of Patent: Oct. 18, 2016

(54) CART CAPABLE OF BEING COMBINED TO A BICYCLE

(71) Applicant: An Yi Lin, Taipei (TW)

(72) Inventor: An Yi Lin, Taipei (TW)

( * ) Notice: Subject to any disclaimer, the term of this patent is extended or adjusted under 35 U.S.C. 154(b) by 0 days.

(21) Appl. No.: 14/140,481

(22) Filed: Dec. 25, 2013

(65) Prior Publication Data

US 2015/0175186 A1  Jun. 25, 2015

(51) Int. Cl.
*A61G 5/00* (2006.01)
*B62B 5/00* (2006.01)
*B62B 3/00* (2006.01)

(52) U.S. Cl.
CPC .............. *B62B 5/0079* (2013.01); *B62B 3/001* (2013.01)

(58) Field of Classification Search
CPC ...... A61G 5/003; B62K 27/00; B62K 27/12; B62K 13/00; B62K 3/16; B62K 5/003; B62K 5/0026
USPC ...... 280/202, 204, 282, 7.16, 240, 259, 266, 280/267, 47.11, 47.34, 263, DIG. 11
See application file for complete search history.

(56) References Cited

U.S. PATENT DOCUMENTS

| | | | | |
|---|---|---|---|---|
| 4,183,418 A | * | 1/1980 | Dudas | 180/216 |
| 4,770,431 A | * | 9/1988 | Kulik | 280/202 |
| 5,193,831 A | * | 3/1993 | Capitoli | 280/202 |
| 8,640,796 B2 | * | 2/2014 | Wilson et al. | 180/2.2 |

* cited by examiner

*Primary Examiner* — Hau Phan
*Assistant Examiner* — Bryan Evans

(57) ABSTRACT

A cart capable of being combined to a bicycle comprises a cart body having a frame portion; at least one front wheel arranged below the frame portion for driving the cart body; the at least one front wheel being at a front portion thereof; and wherein the cart has a combination structure for combining the cart to a bicycle so that the cart is able to be driven by the bicycle. Furthermore, the cart further comprises a steering structure for controlling moving directions of the cart so that when the cart is connected to a bicycle, the steering structure can control the moving direction of the cart. The frame portion has a bottom plate put thereon for carrying object thereon. The frame portion includes a back frame; and the combining structure is installed at a handle linkage of the cart body.

7 Claims, 6 Drawing Sheets

CART CAPABLE OF BEING COMBINED TO A BICYCLE

FIELD OF THE INVENTION

The present invention relates to carts, and in particular to a cart capable of being combined to a bicycle

BACKGROUND OF THE INVENTION

Currently, more and more old people or babies or enabled peoples or patients cannot move by themselves. They must be carried by wheelchairs. Sometimes, people use cart (or wagons) to transfer pets or goods, while theses works need to apply manpower to wheelchairs, carts, or wagons. Since great manpower needs to drive the wheelchairs, carts, or wagons, the moving ranges of these vehicles are confined to be nearby of the driving people. A frequent event is to transfer the old people or babies to a park for sunny. The servant will feel ill at ease due to a great power being applied, but the wheelchair only be moved within finite ranges.

Therefore, if it is desired to improve the aforementioned defects in the prior art, an easy way is to combine the cart to a bicycle which is frequently used in daily life with a very lower cost. If it wants to do so, it is needed to improve the structure of the cart so that the cart can be combined with a bicycle. Therefore, the structure of the cart is needed to be modified so that it is able to be combined to a bicycle easily and fast for carrying goods or people.

SUMMARY OF THE INVENTION

Accordingly, the object of the present invention is to provides a cart capable of being combined to a bicycle, wherein the present invention provides a simple and easily attached and detached structure for combing a cart to a bicycle so the cart can be driven by the bicycle. As a result the cart is able by driven with a fast speed and power being saved. Furthermore, enabled old people or child, or goods can be transferred easily with less power and time. Furthermore, the people and goods can be safely transferred.

To achieve above object, the present invention provides a cart capable of being combined to a bicycle comprises a cart body (2) having a frame portion (32); at least one front wheel (21) arranged below the frame portion (32) for driving the cart body (2); the at least one front wheel (21) being at a front portion of the frame portion (32); and wherein the cart has a combination structure for combining the cart to a bicycle so that the cart is able to be driven by the bicycle. Furthermore, the cart further comprises a steering structure for controlling moving directions of the cart so that when the cart is connected to a bicycle, the steering structure can control the moving direction of the cart; wherein the at least on front wheel is two front wheels (21); the frame portion (32) has a bottom plate (31) put thereon for carrying object thereon; the frame portion (32) includes a back frame (321); and the combining structure is installed at a handle linkage (24) of the cart body.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

With reference to FIGS. 1 to 6, a cart capable of being connected to a bicycle of the present invention is illustrated. In the present invention, the cart may be a wheelchair, a wagon, a cart for carrying pets or goods, etc. All these are within the scope of the present invention.

Figure 1:
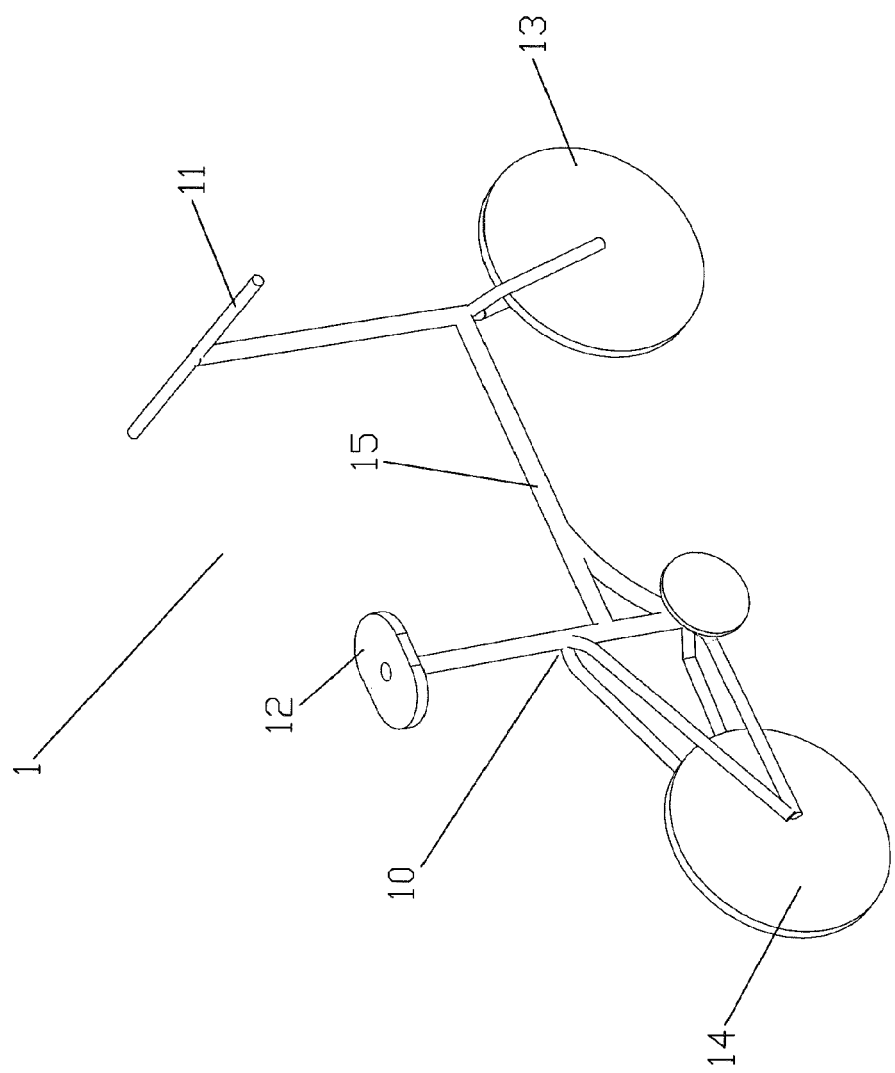
FIG. 1 is a schematic view showing the bicycle used in the present invention.

In the present invention, the cart is use to a bicycle 1. As illustrated in FIG. 1, the bicycle 1 has a backbone 10, a handle 11, a cushion 12, a front wheel 13 and a rear wheel 14. The backbone 10 serves to assemble related components of the bicycle 1. The handle 11, the cushion 12, the front wheel 13 and the rear wheel 14 are assembled to the backbone 10. The backbone 20 has a main tube 15 installed between the front wheel 13 and the rear wheel 14.

Preferably, the rear wheel 14 of the bicycle 1 is greater than the front wheel 13, or the front wheel 13 is foldable so that the rear wheel 14 can grounded.

Figure 2:
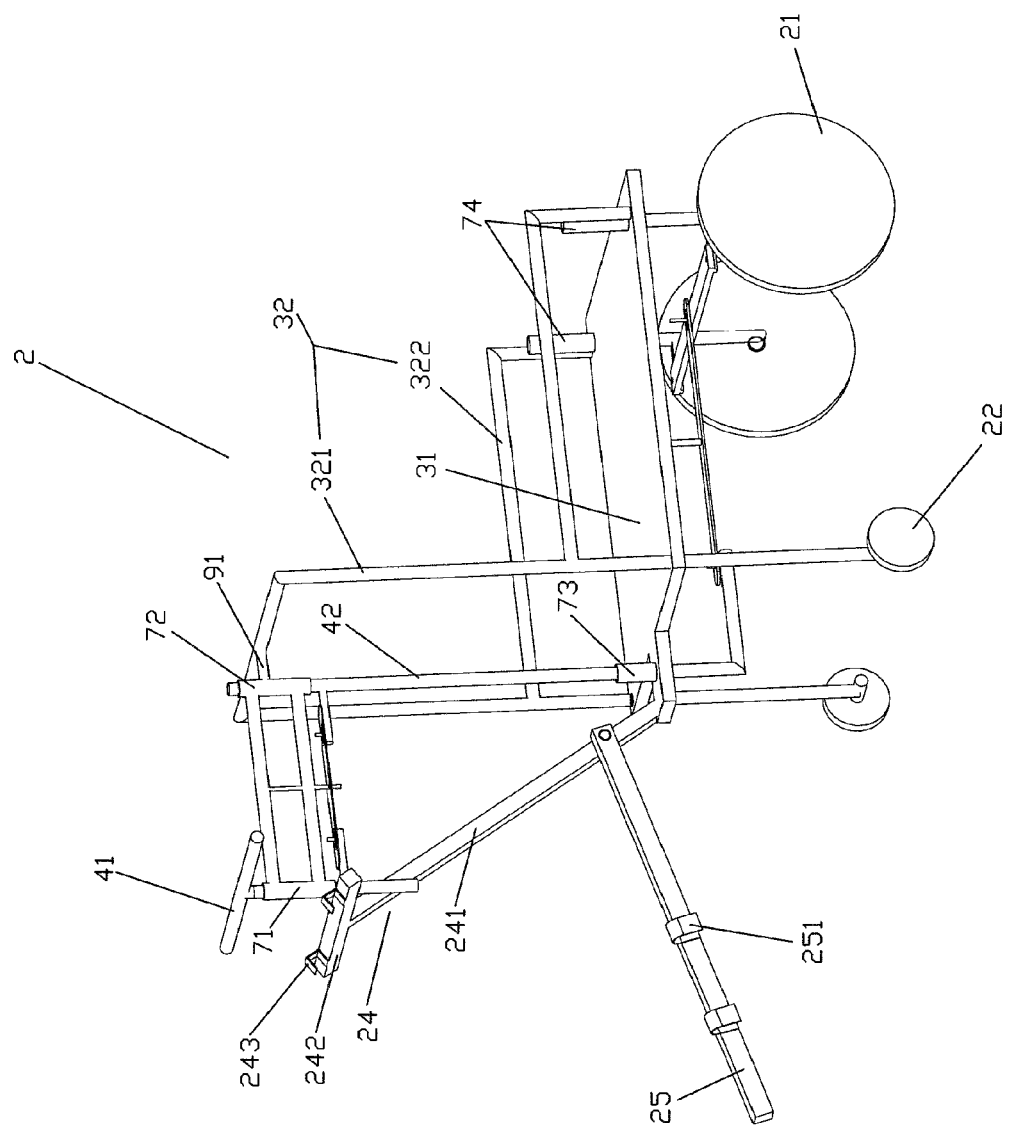
FIG. 2 is a perspective view showing the structure of the cart of the present invention.
Figure 3:
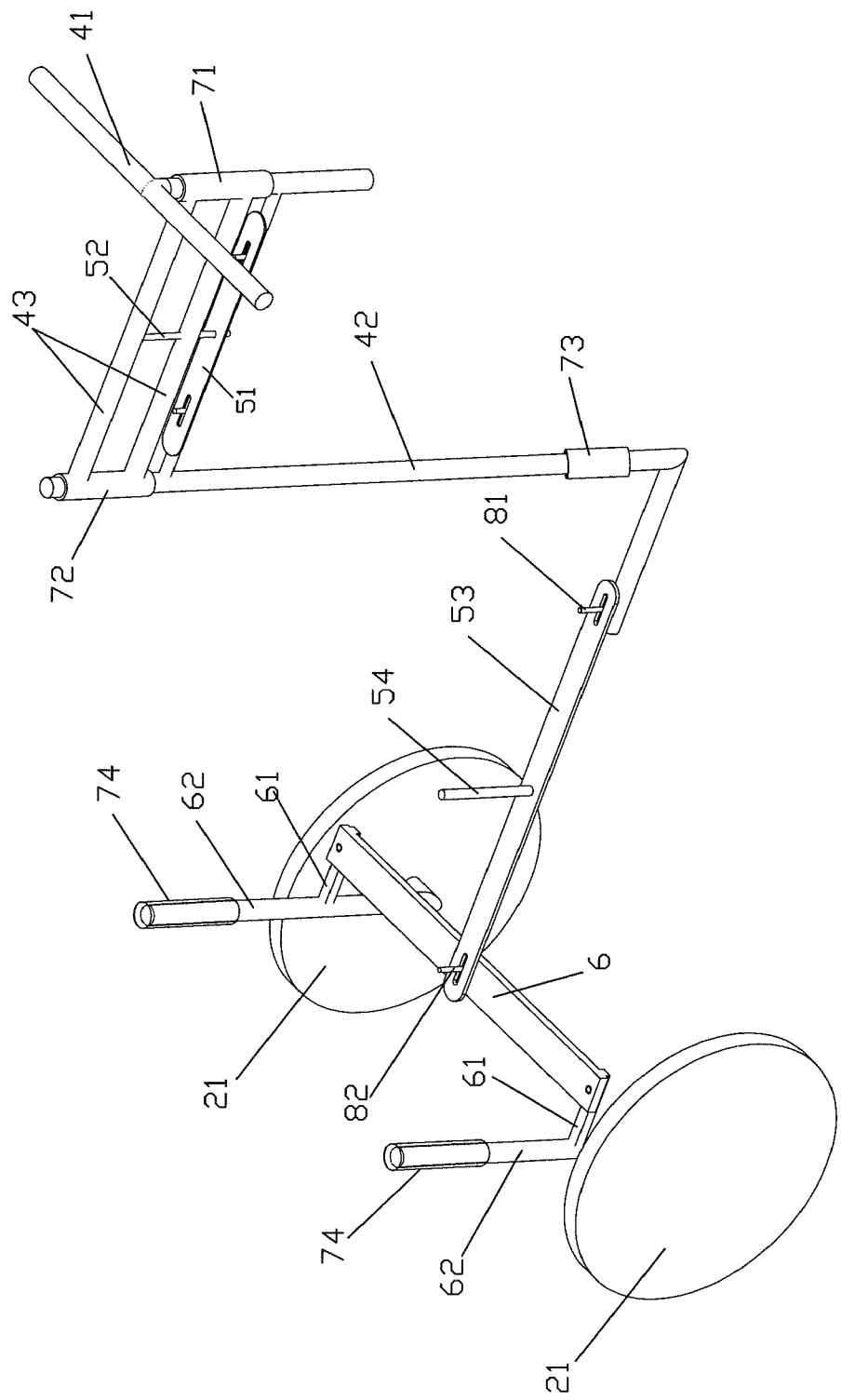
FIG. 3 is a perspective view includes the steering structure of the present invention.
Figure 4:
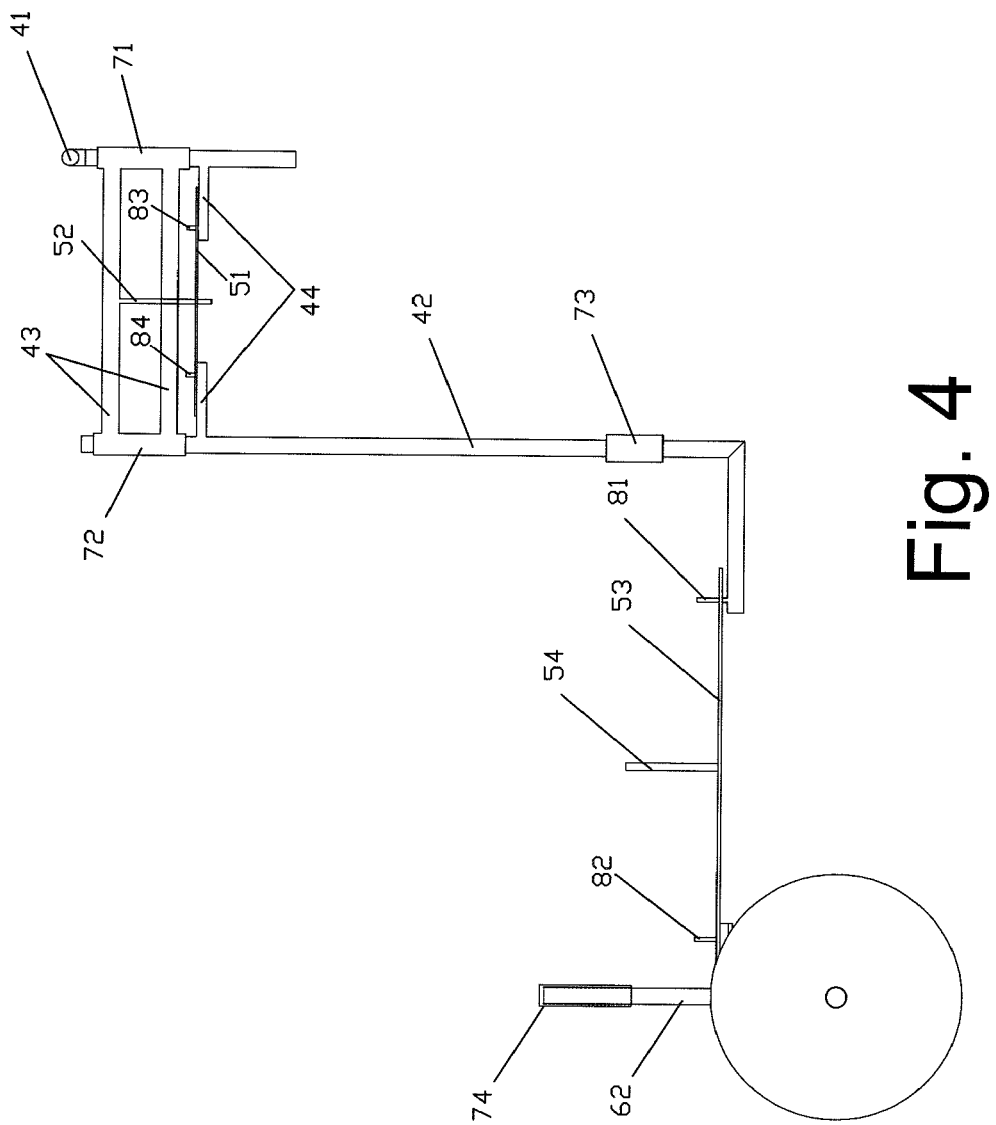
FIG. 4 is a lateral view about the steering structure of the present invention.
Figure 5:
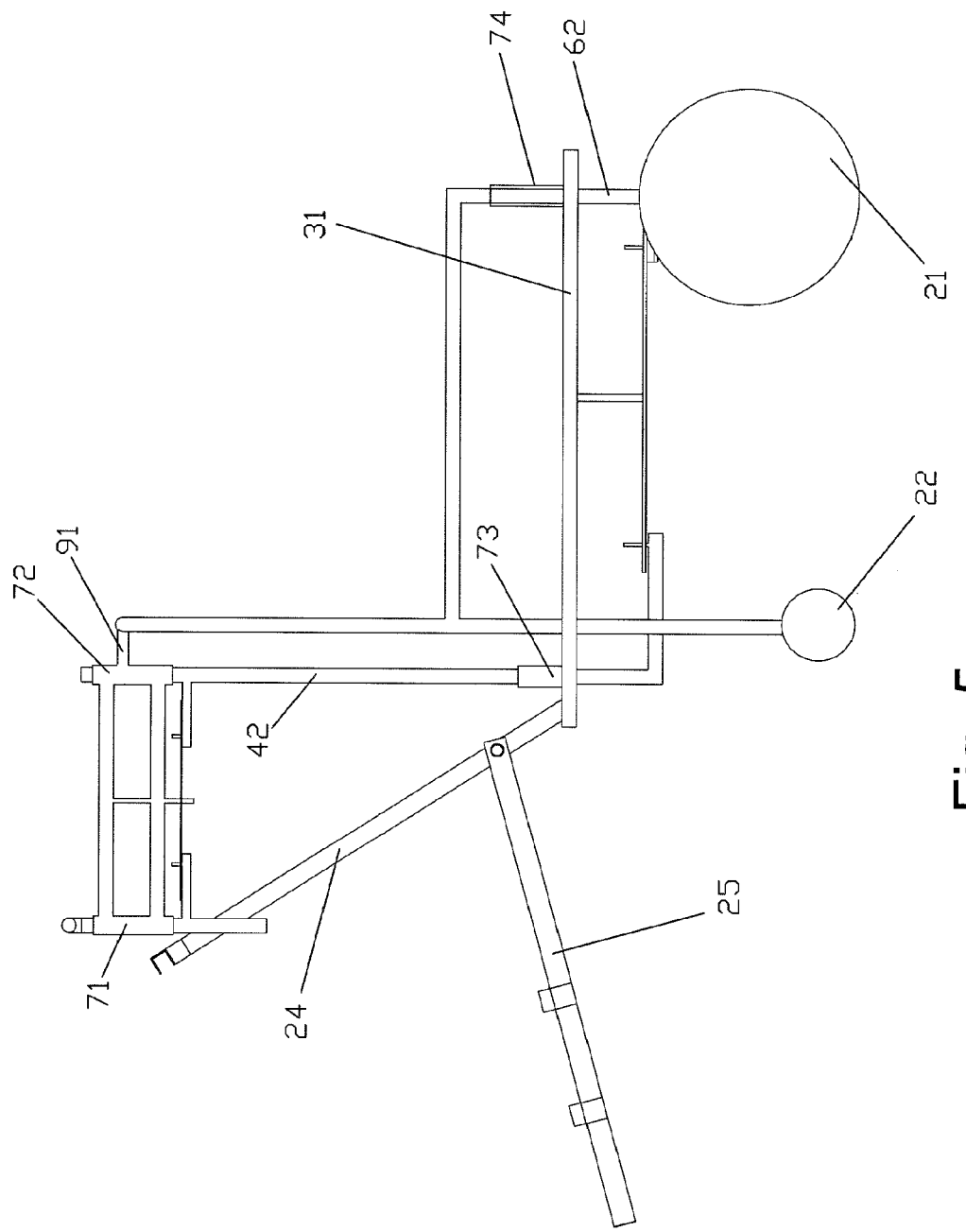
FIG. 5 is a lateral view of the cart of the present invention.

The cart 2, with reference to FIG. 2, includes a framework, two front wheels 21, two rear wheels 22, a handle linkage 24, a bike linkage 25, and a steering structure.

The framework has a bottom plate 31 and a frame portion 32. The bottom plate 31 serves to carry objects thereon. The frame portion 32 further has a back frame 321 capable of being combined to the bottom plate 31, and two lateral frames 322 at two lateral sides of the back frame 321 and adjacent to the back frame 321.

The two front wheels 21 and two rear wheels 22 are installed at a front and a rear side below the framework, respectively, so that the cart 2 is movable. The bottom plate 31 has the effect of carrying objects thereon. Preferably, a cushion (not shown) can be placed on the bottom plate 31 for seating by people. The frame portion 32 has a rod structure assembled a plurality of rods. The bottom plate 31 is fixed to the frame portion 32. The frame portion 32 has the effect of protecting objects or peoples thereon to prevent the objects from falling out.

Preferably, the sizes of the two front wheels 21 of the cart 2 are greater than that of the two rear wheels 22 thereof.

A handle linkage 24 is a T rod including a transversal rod 242 and a straight rod 241 connected to an approximate center of the transversal rod 242. A bottom end of the straight rod 241 is fixedly connected to a rear end of the frame portion 32. Two ends of the transversal rod 242 have respective hooks 243 for hanging to the handle 11 of the bicycle 1. The handle linkage 242 of the cart 2 are connected to the handle 11 of the bicycle 1 so that the cart 2 is connected to the bicycle 1. By this structure, the bicycle 1 will drive the cart 2 to move forwards.

The handle linkage 24 is connected to the handle 11 of the bicycle 1 by various different ways, which are not confined to above mentioned structure. Other ways capable of connecting the handle linkage 24 to the handle 11 of a bicycle 1 is within the scope of the present invention, for example, the hook is replaced by a screw or a stud.

The bicycle linkage 25 is a straight rod connected to the handle linkage 24. One end of the bicycle linkage 25 is connected to the handle linkage 24 by using a rotatable joint. The bicycle linkage 25 has at least one hooks 251 (in the drawing, two hooks are displayed) for hooking the main tube 15 of the bicycle 1. Therefore, the cart 2 is fixable to the main tube 15 of the bicycle 1. Therefore, the bicycle 1 can drive the cart 2.

The bicycle linkage 25 is connectable to the main tube 15 by various ways and is not confined to above mentioned way, for example, the hook 251 is replaced by a screw or a stud.

With reference to FIGS. 2, 3, 4, and 5, the steering structure of the present invention includes:

A steering assembly includes a steer handle 41, an L shape transferring rod 42, at least one transversal rod 43 (two transversal rods 43 are illustrated), two extending rods 44, a second turning linkage 51, a first sleeve 71, a second sleeve 72 and a third sleeve 73.

The transversal rod 42 is connected between the first turning sleeve 71 and the second turning sleeve 72. The second sleeve 72 is fixed to an upper end of the backside of the frame portion 32 of the cart 2 and the third sleeve 73 is fixed to a lower end of a backside of the frame portion 32 of the cart 2. The transferring rod 42 passes through the second sleeve 72 and the third sleeve 73.

A transversal bar of the steering handle 41 is used as a handle of the steering structure. A straight bar of the steering handle 41 passes through the first sleeve 71 and is retained thereon so that it is rotatable within the first sleeve 71.

The transferring rod 42 is rotatable within the second sleeve 72 and the third sleeve 73. A lower end of the transferring rod 42 has a bending portion and a bar 81 protruding from the bending portion. Preferably, the second sleeve 72 has a protruding rod 91 for being connected to the back frame 321 of the frame portion 32.

Distal ends of the two extending rods 44 have respective protruding bars 83, 84. A head of one extending rod 44 is extended from a lower end of the steering handle 41 at a position lower than the first sleeve 71. Another extending rod 44 has a head extended from the transferring rod 42 at a position lower than the second sleeve 72.

Two ends of the first turning linkage 51 are formed with respective holes for receiving the protruding bars 83, 84 of the extending rods 44. A middle section of the first turning linkage 51 has a through hole for receiving a first shaft 52. Thereby, the first turning linkage 51 is fixed to the first shaft 52 and is rotatable along the first shaft 52. The first shaft 52 is retained to middle sections of the two transversal rods 43 of the steer assembly. When a user rotates the steering handle 41, the first turning linkage 51 will rotate to drive the transferring rod 42.

A second turning linkage 53 is a long straight rod body. A middle section of the second turning linkage 53 has a through hole for passing through a second shaft 54. An upper end of the second shaft 54 is fixed to the bottom plate 31 of the framework. Thereby, the second turning linkage 53 will rotate along the second shaft 54. Two ends of the second turning linkage 53 have respective holes.

A transversal driving bar 6 is a long bar. A middle section of the transversal driving bar 6 has a second protruding bar 82. Each of two ends of the transversal driving bar 6 has a respective turning arm 61 which is fixedly connected to the turning shaft 62. When the turning arm 61 moves, the turning shaft 62 will rotate therewith. The turning shaft 62 passes through a fourth sleeve 74 which is fixedly connected to the frame portion 32 of the cart 2. One end of the turning shaft 62 will rotate along the fourth sleeve 74 and another end of the turning shaft 62 is connected to one of the front wheel 21 of the cart 2.

The first protruding bar 81 extended from a bending portion at the lower end of the transferring rod 42 passes through the hole at a head of the second turning linkage 53. The hole at a tail end of the second turning linkage 53 receives the second protruding bar 82 of the transversal driving bar 6. When the transferring rod 42 rotates, the transversal driving bar 6 will be driven to move.

The transversal driving bar 6 can be driven to move leftwards or rightwards to drive the turning arms 61 and then to rotate the turning shafts 62. The rotation of the turning shafts 62 will cause the two front wheels 21 of the cart 2 to rotate therewith.

Figure 6:
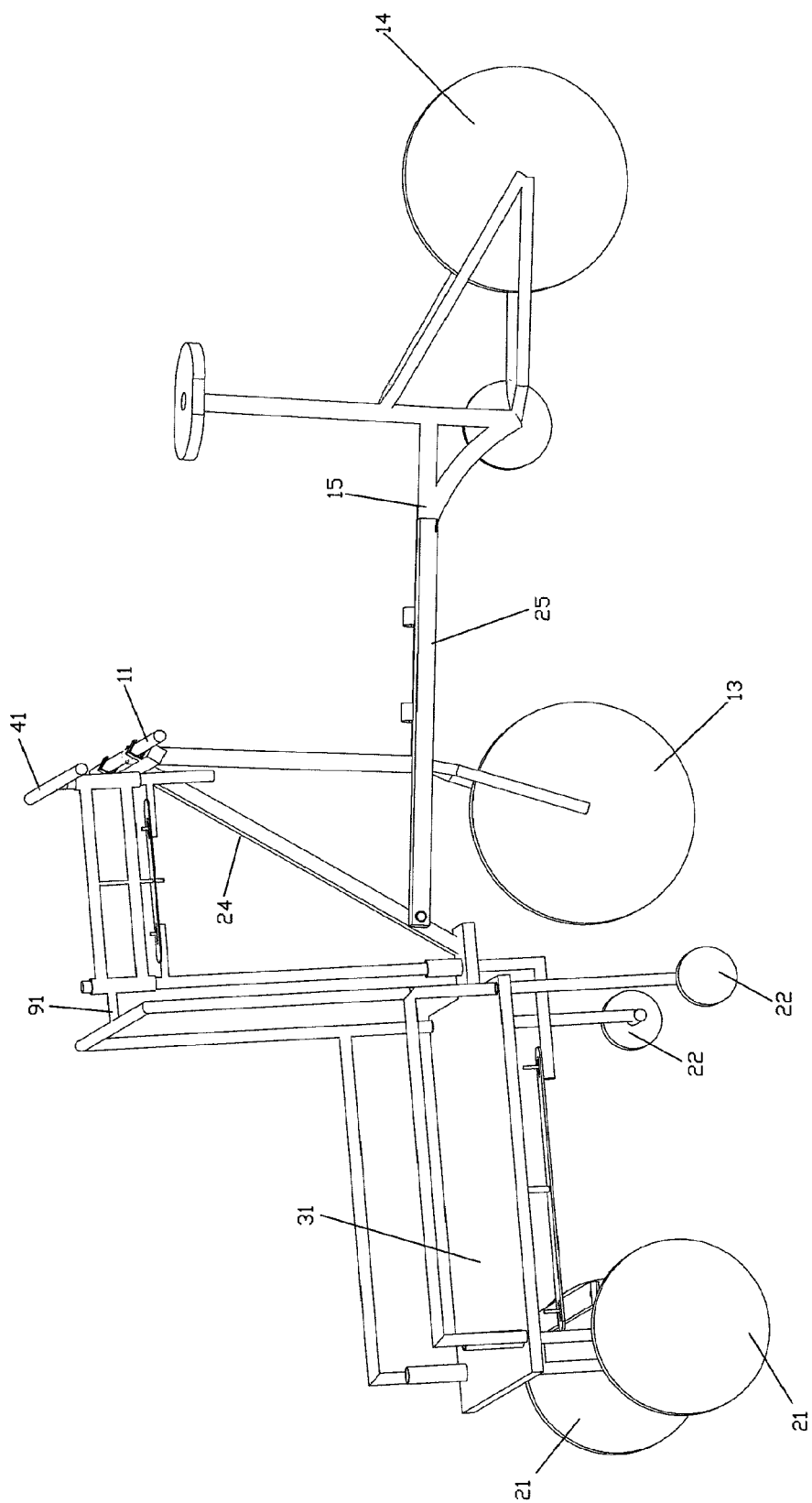
FIG. 6 is a structural vie about the combination of the cart and a bicycle according to the present invention.

With reference to FIG. 6, operation of the present invention will be described herein.

Firstly, the hooks 243 of the handle linkage 24 of the cart 2 are hooked to the handle 11 of the bicycle 1 so that the cart 2 is connected to the bicycle 1. As a result, the bicycle 1 can drive the cart 2 to move forwards.

Secondly, the at least one hook 251 of the bicycle linkage 25 is hooked to the main tube 15 of the bicycle 1 so that the cart 2 is connected to the main tube 15 of the bicycle 1. Thus the cart 2 is firmly secured to the bicycle 1 for being driven to move.

After the cart 2 is combined with the bicycle 1, the bicycle 1 can drive the cart 2 to move.

In the present invention, it is suggested that the rear wheel 14 of the bicycle 1 is greater than the front wheel 13 thereof, or the front wheel 14 of the bicycle 1 is foldable. After folding the front wheel 14, only the rear wheel 22 grounds. Furthermore, it is preferable, the size of the front wheels 21 of the cart 2 is greater than that of the rear wheels 22 of the cart 2. Thus, when the cart 2 is combined to the bicycle 1, the front wheel 13 of the bicycle 1 and the rear wheels 22 of the cart 2 are then not grounded and only the rear wheel 14 of the bicycle 1 and the two front wheels 21 of the cart 2 ground for movement.

The driver of the bicycle 1 can hold the steering handle 41 of the cart 2 for controlling the moving direction of the combination structure of the cart 2 with the bicycle 1.

Advantages of the present invention are that the present invention provides a simple and easily attached and detached structure for combing a cart to a bicycle so the cart can be driven by the bicycle. As a result the cart is able by driven with a fast speed and power being saved. Furthermore, enabled old people or child, or goods can be transferred easily with less power and time. Furthermore, the people and goods can be safely transferred.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A cart capable of being combined to a bicycle, comprising:

a cart body (2) having a frame portion (32);

at least one front wheel (21) arranged below the frame portion (32); the at least one front wheel (21) being at a front portion of the frame portion (32); and wherein the cart has a combination structure for combining the cart to a bicycle so that the cart is able to be driven by the bicycle; and a transversal rod (43) connected between a first turning sleeve (71) and a second turning sleeve (72); the second sleeve (72) being fixed to an upper end of the backside of the frame portion (32) of the cart and a third sleeve (73) being fixed to a lower end of a backside of the frame portion (32) of the cart;

a transversal bar of the steering handle (41) used as a handle of the steering structure; a straight bar of the steering handle (41) passing through the first sleeve (71) and being retained thereon so that it is rotatable within the first sleeve (71);

a transferring rod (42) passing through the second sleeve (72) and the third sleeve (73); the transferring rod (42) being rotatable within the second sleeve (72) and the third sleeve (73); a lower end of the transferring rod (42) having a bending portion and a bar (81) protruding from the bending portion;

two extending rods (44); one extending rod being extended from a lower end of the steering handle (41) at a position lower than the first sleeve (71); another extending rod (44) being extended from the transferring rod (42) at a position lower than the second sleeve (72); distal ends of the two extending rods (44) having respective protruding bars (83, 84);

a first turning linkage (51); two ends of the first turning linkage (51) being formed with respective holes for receiving the protruding bars (83, 84) of the extending rods; a middle section of the first turning linkage (51) having a through hole for receiving a first shaft (52); thereby, the first turning linkage (51) being fixed to the first shaft (52) and being rotatable along the first shaft (52); the first shaft (52) being retained to middle sections of the two transversal rods (43) of the steer assembly;

a second turning linkage (53) being a long straight rod body; a middle section of the second turning linkage (53) having a through hole for passing through a second shaft (54); an upper end of the second shaft (54) being fixed to the bottom plate of the frame portion (32); thereby, the second turning linkage (53) will rotate along the second shaft (54); two ends of the second turning linkage (53) having respective holes;

a transversal driving bar (6) being a long bar; a middle section of the transversal driving bar (6) having a second protruding bar (82); each of two ends of the transversal driving bar having a respective turning arm (61) which is fixedly connected to the turning shaft; when the turning arm (61) moves, the turning shaft (62) will rotate therewith; the turning shaft (62) passing through a fourth sleeve (74) which is fixedly connected to the frame portion (32) of the cart (2); one end of the turning shaft (62) will rotate along the fourth sleeve (74) and another end of the turning shaft (62) being connected to one of the front wheel (21) of the cart (2);

the first protruding bar (81) extended from a bending portion at the lower end of the transferring rod (42) passing through the hole at a head of the second turning linkage (53); the hole at a tail end of the second turning linkage (53) receiving the second protruding bar (82) of the transversal driving bar (6); when the transferring rod (42) rotates, the transversal driving bar (6) will be driven to move; and wherein the transversal driving bar (6) can be driven to move leftwards or rightwards to drive the turning arms (61) and then to rotate the turning shafts (62); the rotation of the turning shafts (62) will cause the two front wheels (21) of the cart (2) to rotate therewith.

2. The cart capable of being combined to a bicycle as claimed in claim 1, further comprising:

a steering structure for controlling moving directions of the cart so that when the cart is connected to a bicycle, the steering structure can control the moving direction of the cart;

wherein the at least on front wheel is two front wheels (21);

the frame portion (32) has a bottom plate (31) put thereon for carrying object thereon; the frame portion (32) including a back frame (321); and the combination structure being a handle linkage (24) of the cart body.

3. The cart capable of being combined to a bicycle as claimed in claim 2, wherein the handle linkage (24) is a T rod including a transversal rod (242) and a straight rod (241) connected to an approximate center of the transversal rod (242); a bottom end of the straight rod (241) is fixedly connected to a rear end of the frame portion (32); two ends of the transversal rod (242) have respective hooking assembly for hanging to the handle of the bicycle; the handle linkage (24) of the cart are connected to the handle of the bicycle so that the cart is connected to the bicycle.

4. The cart capable of being combined to a bicycle as claimed in claim 2, further comprising a bicycle linkage (25) which is a straight rod connected to the handle linkage (24); one end of the bicycle linkage (25) being connected to the handle linkage (24) by using a rotatable joint; the bicycle linkage (25) having at least one hooking structure for hooking a main tube of the bicycle; therefore, the cart being fixable to the main tube of the bicycle.

5. The cart capable of being combined to a bicycle as claimed in claim 1, further comprising two rear wheels positioned below the frame portion (32); a size of the two front wheels are greater than that of the two rear wheels.

6. The cart capable of being combined to a bicycle as claimed in claim 2, wherein the cart is one of a wheelchair, a pet cart, a baby cart and a hand driving cart.

7. The cart capable of being combined to a bicycle as claimed in claim 2, wherein after combining the cart to the bicycle, a front wheel of the bicycle is not grounded.

\* \* \* \* \*